Dec. 10, 1940.　　　K. L. TATE ET AL　　　2,224,618
HYGROMETER
Filed May 27, 1939
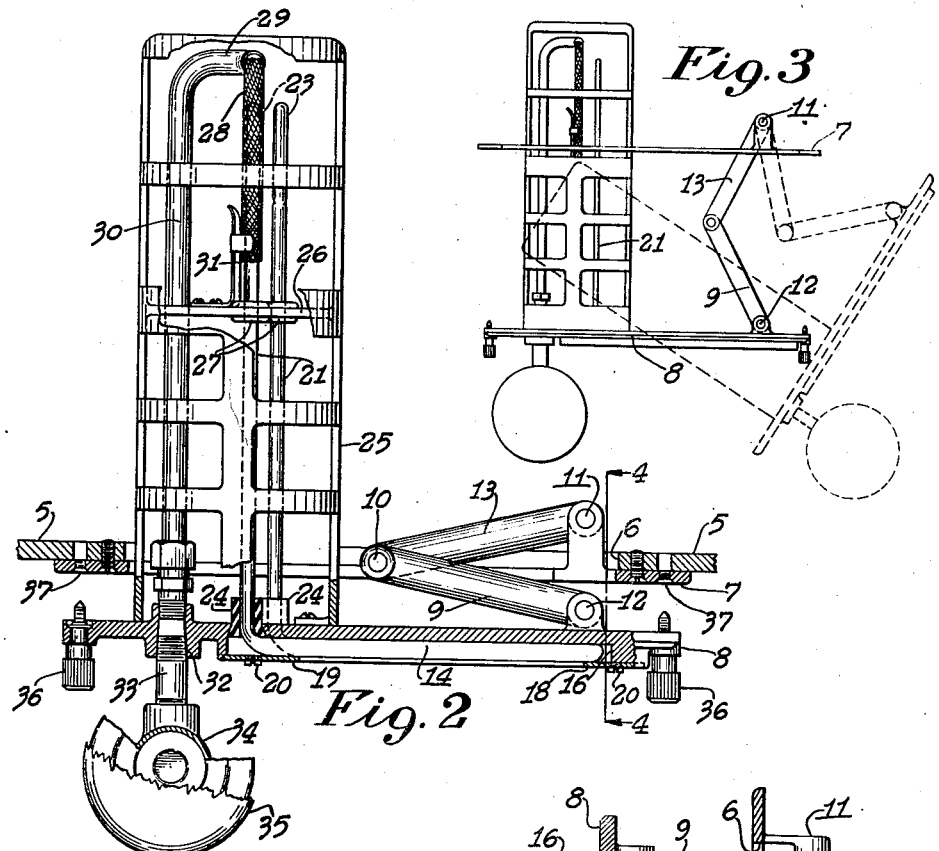
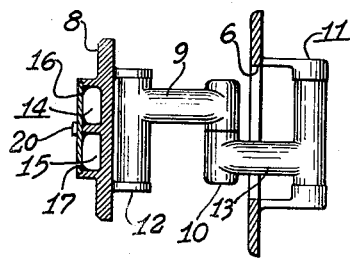
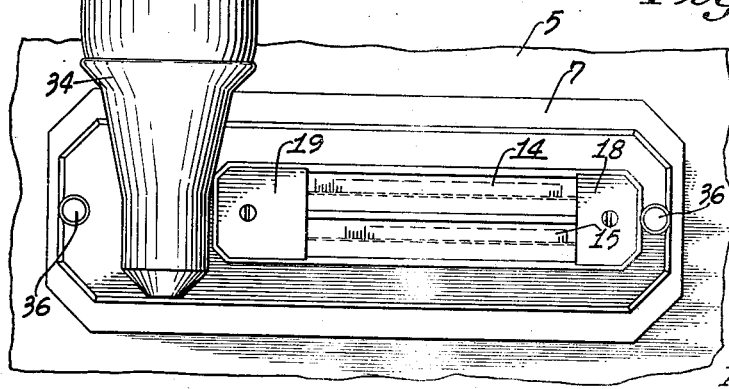
INVENTOR.
KENNETH L. TATE
ARTHUR E. IRVING
BY
D. Clyde Jones
ATTORNEY Patented Dec. 10, 1940

2,224,618

UNITED STATES PATENT OFFICE 2,224,618

HYGROMETER

Kenneth L. Tate and Arthur E. Irving, Rochester, N. Y., assignors to Taylor Instrument Companies, Rochester, N. Y., a corporation of New York Application May 27, 1939, Serial No. 276,136

6 Claims. (Cl. 73—338)

This invention relates to hygrometers.

In many installations of hygrometers it is necessary that the bulbs of the wet and dry bulb thermometers project into a duct or other closed compartment and yet it is essential that these bulbs be readily accessible for cleaning, servicing and the like. In prior hygrometers of this type it has been the practice to screw the mounting plate of the wet and dry bulb thermometers to the wall of the duct. Thus when the wick of the wet bulb thermometer had to be replaced, it was necessary to unscrew the screws from the mounting plate and from the wall. Frequently the hygrometer is mounted in a position where it can only be reached from a ladder so that the attendant while standing on the ladder had to hold the hygrometer and screws, and at the same time manipulate the screw driver. This operation was further complicated by the need of holding the instrument so that the water in the reservoir would not be spilled. In former instruments of this type, the moisture-supplying wick was tied by means of thread to the bulb of the wet bulb thermometer. This tying of the thread was inconvenient and as a consequence thereof, the wicking was frequently not cleaned or replaced as often as necessary for efficient operation.

In accordance with the present invention there is provided a hygrometer of the wet and dry bulb thermometer type in which the bulbs of the thermometers project at right angles to the mounting plate of the thermometers, which plate is extensibly and swingably mounted to serve as a door or closure for an opening into the duct or compartment into which the thermometer bulbs project. Since it is desirable to keep the size of the mounting plate and frame within reasonable limits, the mounting plate is supported on a triple hinge where it can be moved bodily with respect to the frame and also swung with respect thereto. In this way the relatively large bulb guard which projects from the rear of the mounting plate of the hygrometer can be withdrawn and swung from its normal position within the duct to a position whereby the thermometer bulbs within the guard are outside of the duct and readily accessible for replacing the wick of the wet bulb thermometer.

In former hygrometers, the wet bulb thermometer and the dry bulb thermometer each had a graduated scale plate separate from its thermometer tube. Thus when a thermometer tube was broken, it was either necssary to match a new thermometer tube to the scale or else supply a new thermometer tube and scale as well. In any case the repairing of such a hygrometer was necessarily done by the manufacturer. In accordance with the present invention the wet bulb thermometer and the dry bulb thermometer have their graduations etched or engraved on the indicating portions of the thermometer tubes. Thus the thermometers are interchangeable and the user can have a spare thermometer which he can quickly substitute for one that has been broken in the hygrometer. This can be done without removing the hygrometer from service for a long period as is necessary when the device must be repaired by the manufacturer.

The various other features of the invention will appear from the detailed description and claims when taken with the drawing wherein Fig. 1 is a front elevation of the hygrometer of the present invention, together with a fragment of the wall of the duct or other closed compartment with which the hygrometer is to be used; Fig. 2 is a plan view partially in section of the hygrometer of Fig. 1, the hygrometer being partially displaced from its normal position on the wall of the duct; Fig. 3 is a similar plan view disclosing by the full line and dotted line showings, the wide range of movement of the hygrometer proper; and Fig. 4 is a vertical section on the line 4—4 of Fig. 2.

The hygrometer of the present invention is herein illustrated as mounted on a wall 5, which may be the wall of an air duct or may be the wall of a closed compartment wherein temperature and humidity readings are desired. The wall 5 has a rectangular opening 6 therein. A frame 7 having an opening therethrough of approximately the same size as that of the opening 6, provides a border for the opening. The opening in the frame, as well as the opening 6 in the wall 5, is closed by a mounting plate 8. This mounting plate is supported on the frame 7 by a triple hinge including the arms 13 and 9 which are pivoted to each other on the pintle 10 and which are also respectively pivoted to the frame at point 11 and to the plate at point 12. The operation of this triple hinge will be further described hereinafter.

The indicating portion 14 of the wet bulb thermometer and the indicating portion 15 of the dry bulb thermometer are mounted in parallel relation in the face of the mounting plate. Preferably the mounting plate is provided with two channels 16 and 17 of a width to receive the indicating portion of the thermometer. As herein illustrated, the indicating section of each thermometer is of a ribbon type, that is, rectangular in cross section and thereby provides a broad rear surface on which the graduations and numerals can be etched or engraved and yet these markings are of sufficient size so that they can be easily read through the glass of the indicating section. Thus by having the graduations on the rear of the tube there is no danger that the pigment in the graduations will be destroyed by repeated cleaning or wiping of the front of the thermometer tube. The indicating portions of the thermometers are held in place by caps 18 and 19, secured in position adjacent the respective ends of the indicating portions of the thermometers, by screws 20 engaging the mounting plate.

Each thermometer tube includes a connecting section 21 of marine tubing attached at an end thereof to said indicating portion and terminating at its other end in a related bulb such as 23. It will be noted that the connecting section of each thermometer extends through an opening in the mounting plate and projects rearwardly at right angles thereto. At the points where the connecting tubes 21 pass through the mounting plate there are provided rubber bushings 24 which serve not only to cushion the thermometer tube against injury but also function to insulate the thermometers against heat transfer between them and the mounting plate. It will also be noted that the connecting tube and bulbs are staggered or offset whereby they are not in the same horizontal or vertical planes so that the instrument can be used in either vertical or horizontal chambers with equal efficiency. Thus neither of the thermometer bulbs shields the other from the air stream in the duct when mounted in either of these planes. On the rear of the mounting plate there is fastened a rearwardly projecting cage or guard 25 for protecting the rearwardly projecting portions of the thermometers. This cage may be made in various forms, provided it affords the necessary protection for the rearwardly projecting portions of the thermometers and yet permits ready circulation of air about the bulbs of these thermometers. The cage intermediate its length, is provided with a vertical partition 26 adapted to support rubber bushings such as 27. These bushings, in turn, support the connecting portions of the thermometers and yet insulate them against heat transfer between them and the cage.

The bulb 23 of the wet bulb thermometer is enclosed by a wick 28 which extends into the upturned end 29 of a water supply pipe 30. A clip 31 supported on the partition 26 has fingers which grip the tubular wicking to hold it in position over the wet bulb 23, thereby obviating the need of tying the wicking to the bulb by means of thread. It will be understood that when it is desired to replace this wicking, the fingers of the clip can be disengaged from the wicking and the thermometer tube. The supply pipe 30 is supported by the mounting plate and communicates through an opening 32 in the mounting plate with the pipe 33 supported on the front of the mounting plate. Pipe 33 supports the reservoir 34 and communicates with the bottom thereof. This reservoir is upwardly flared and is of such contour as to receive the neck of a "stubby" type of beverage bottle 35 now commonly in use.

In mounting the hygrometer on the wall 5 the bottle 35 is removed from the reservoir and the plate 8 is separated from the frame 7. This separation is effected at the pintle 10. Then the frame 7 is screwed to the wall 5 in a position to serve as a border for the opening 6. Thereafter the frame 7 and mounting plate 8 are reassembled by hingedly connecting the links 9 and 13 at pintle 10 while these parts are in the position shown in dotted lines in Fig. 3. The bottle 35 with a supply of water therein can then be placed in inverted position in the reservoir 34.

During use the mounting plate 8 is moved into contact with the frame 7, being held in this position by the captive screws 36 which engage the threaded openings 37 in the frame 7. When, however, it is desired to inspect, clean the thermometer bulbs or change the wick, the captive screws 36 are disengaged from their threaded apertures 37 in the frame. Thereafter the mounting plate can be moved bodily forward to a position approximately that shown in full lines in Fig. 3. Thereafter the mounting plate can be swung on the triple hinge through the opening in the frame to the position shown approximately in dotted lines in Fig. 3.

We claim:

1. In combination with a wall of a duct or compartment, said wall having an opening therein, a plate of a size to close said opening, a triple hinge extensibly and hingedly connecting said plate to said wall adjacent said opening, a thermometer comprising an indicating section and an angular connecting section terminating in a bulb, said indicating section extending in a plane parallel to that of said plate and being secured to said plate in a position to be visible from the front surface thereof, said connecting section projecting into said opening from said plate a distance greater than the largest dimension of said opening.

2. In combination with the wall of a duct or compartment, said wall having an opening therein, a plate hingedly and extensibly mounted on said wall and of a size to close said opening, a thermometer comprising an indicating section and an angular connecting section terminating in a bulb, said indicating section extending in a plane parallel to that of said plate and being secured to said plate in a position to be visible from the front surface thereof, said connecting section projecting from the rear surface of said plate into said duct or compartment, a thermometer guard protecting said connecting section and bulb and projecting from the rear surface of said plate a greater distance than the maximum dimension of said opening.

3. In combination with the wall of a duct or compartment, said wall having an elongated opening therein, an elongated plate mounted by a triple hinge on said wall and of a size to close said opening, a dry bulb thermometer and a wet bulb thermometer, each comprising an indicating section and an angular connecting section terminating in a bulb, each indicating section extending in a plane parallel to that of said plate and being connected to said plate, each connecting section projecting rearwardly from said plate a distance greater than the maximum dimension of said opening, said connecting sections and bulbs being offset relative to each other so that the planes, passing through the respective connecting sections and bulbs parallel to the longitudinal and transverse axes of said elongated plate will be spaced apart, and means for supplying moisture to said wet bulb.

4. A hygrometer comprising an open frame, a plate of a size to close the opening in said frame, a pair of arms, means for pivotally connecting one end of one arm to said frame and means for pivotally connecting one end of the other arm to said plate, the free ends of said arms being pivotally connected together, a dry bulb thermometer and a wet bulb thermometer, each comprising an indicating section and an angular connecting section terminating in a bulb, each indicating section extending in a plane parallel to and secured to said plate in a position to be visible from the front thereof, each connecting section projecting at right angles from the rear surface of said plate a distance greater than the largest dimension of said opening, and means for supplying moisture to said wet bulb.

5. A device of the character described, comprising a plate, a thermometer comprising an indicating section and an angular connecting section terminating in a bulb, said indicating section extending in a plane parallel to and secured to one face of said plate, said angular connecting section projecting from the other surface of said plate, an arm having one end thereof hinged to said plate adjacent one end thereof, and a second arm hingedly connected at one end thereof to the free end of said first-mentioned arm, and means on the other end of said second arm for hingedly connecting the same to a support.

6. A device of the character described, comprising an open frame, a plate of a size to close the opening in said frame, a thermometer comprising an indicating section and an angular connecting section terminating in a bulb, said indicating section extending in a plane parallel to and secured to one face of said plate, said angular connecting section projecting from the other surface of said plate a distance greater than the largest dimension of said opening, an arm having one end thereof hinged to said plate adjacent one end thereof, a second arm hingedly connected at one end thereof to the free end of said first-mentioned arm, and means on the other end of said second arm for hingedly connecting the same to said frame whereby said plate is hingedly and extensibly connected to said frame.

KENNETH L. TATE.
ARTHUR E. IRVING.